No. 818,662. PATENTED APR. 24, 1906.
H. H. BUFFUM.
SLIDE GEAR.
APPLICATION FILED JULY 8, 1904.

3 SHEETS—SHEET 1.

Witnesses:
Rollin Abell.
A. C. Ratigan

Inventor:
H. H. Buffum
By Wright Brown & Quinby
Attys.

No. 818,662. PATENTED APR. 24, 1906.
H. H. BUFFUM.
SLIDE GEAR.
APPLICATION FILED JULY 8, 1904.

3 SHEETS—SHEET 2.

Witnesses:
Rollin Abell.
A. C. Ratigan

Inventor:
H. H. Buffum
by Wright Brown & Quinby
Attys.

No. 818,662. PATENTED APR. 24, 1906.
H. H. BUFFUM.
SLIDE GEAR.
APPLICATION FILED JULY 8, 1904.

3 SHEETS—SHEET 3.

Witnesses
Rollin Abell
A. C. Ratigan

Inventor:
H. H. Buffum
By Wright Brown Quinby
Attys.

UNITED STATES PATENT OFFICE.

HERBERT H. BUFFUM, OF ABINGTON, MASSACHUSETTS, ASSIGNOR TO H. H. BUFFUM COMPANY, OF ABINGTON, MASSACHUSETTS, A CORPORATION OF MAINE.

SLIDE-GEAR.

No. 818,662.     Specification of Letters Patent.     Patented April 24, 1906.

Application filed July 8, 1904. Serial No. 215,721.

*To all whom it may concern:*

Be it known that I, HERBERT H. BUFFUM, of Abington, in the county of Plymouth and State of Massachusetts, have invented certain new and useful Improvements in Slide-Gears, of which the following is a specification.

This invention relates to gearing of the sliding-shift type for connecting a driving-shaft with a driven shaft in a plurality of forward-speed relations and in a reverse-driving relation.

One of the main objects of the invention is to reduce the complication of gearing of this type and the cost of constructing the same; and a further object is to reduce the number of gears which run idly when not in use.

In carrying out the invention I employ the principle of alining the driving and driven shafts, so as to obtain a direct drive at one of the speeds, preferably the highest forward speed, for which, however, no claim for novelty is here made; but in place of employing a shiftable member splined to the driven shaft for the purpose of changing gear, as is a common practice, I make use of a shiftable member on the counter-shaft, which it is unnecessary to spline. The reversing-gearing is also carried with this shiftable member, and the driving-gear is elongated, so that one of the gears of the shiftable member remains in mesh therewith in both the low-speed forward drive and the reverse drive. Further features of improvement will be hereinafter alluded to.

Figure 1:
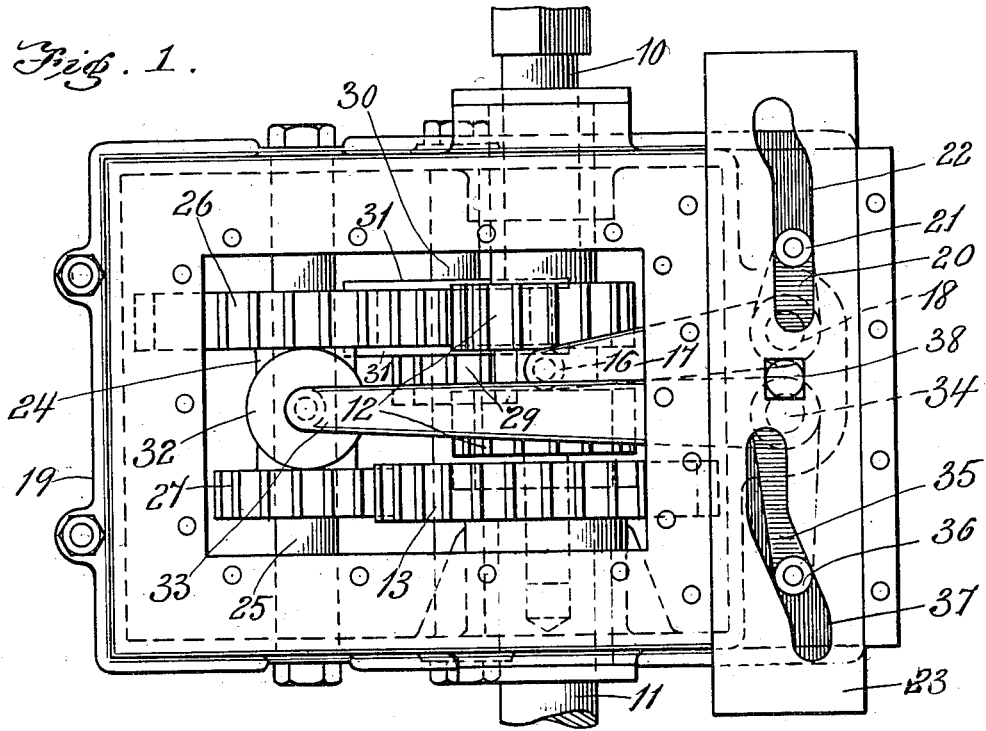
Figure 2:
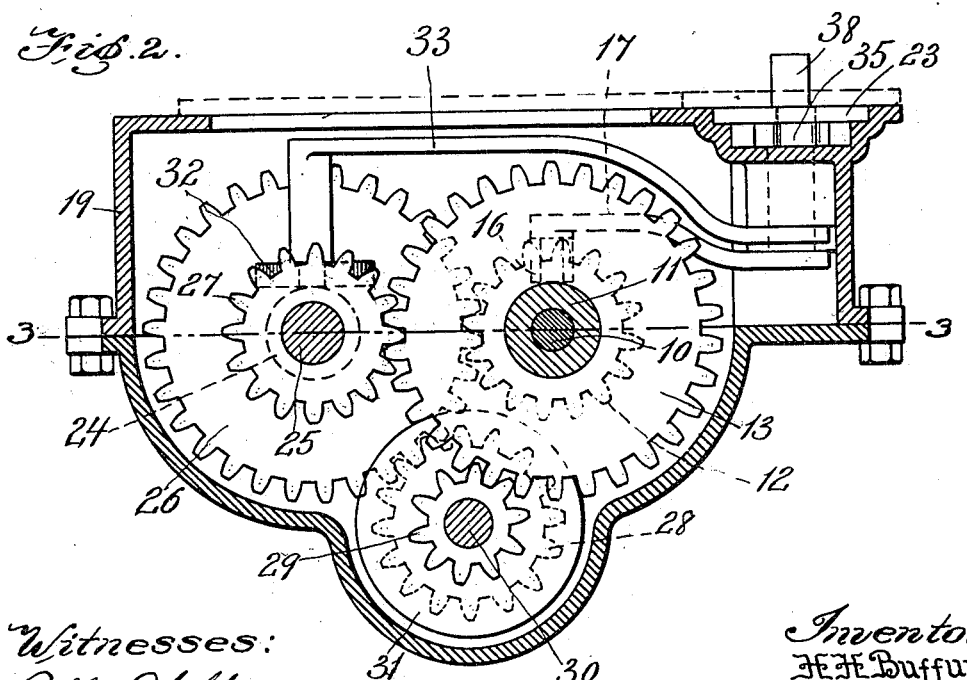
Figure 3:
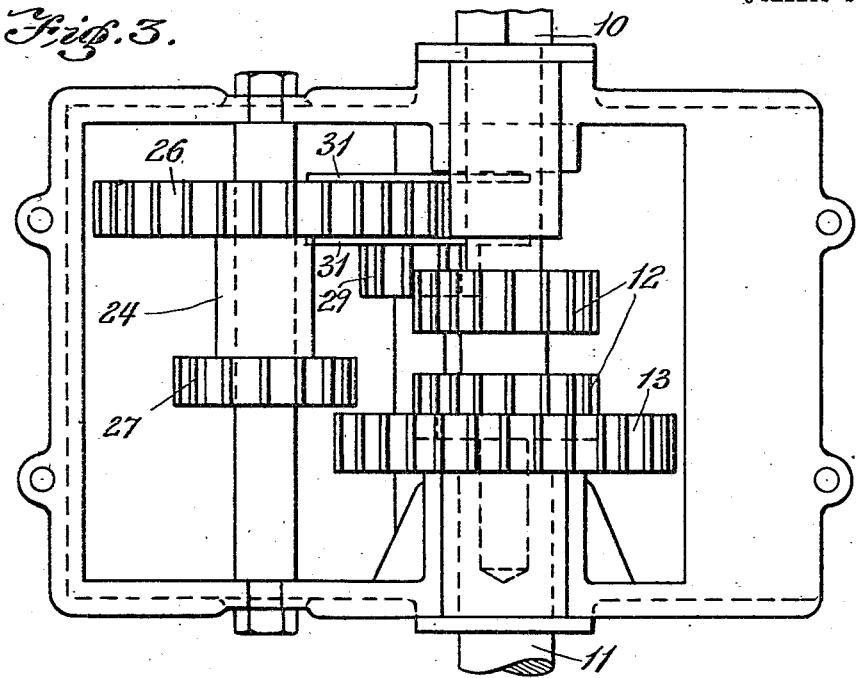
Figure 4:
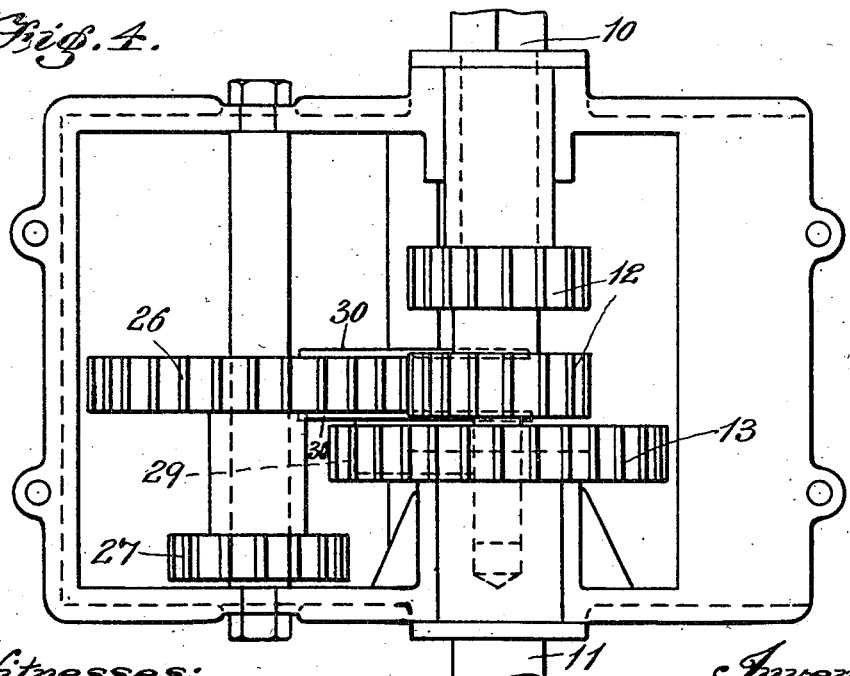
Figure 5:
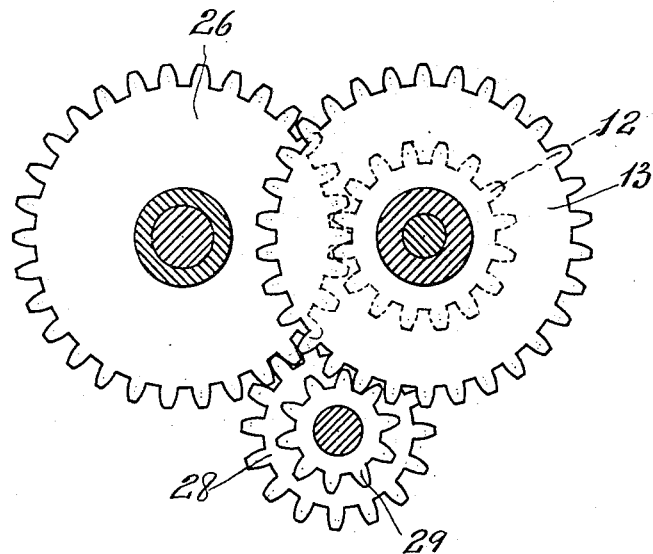
Figure 6:
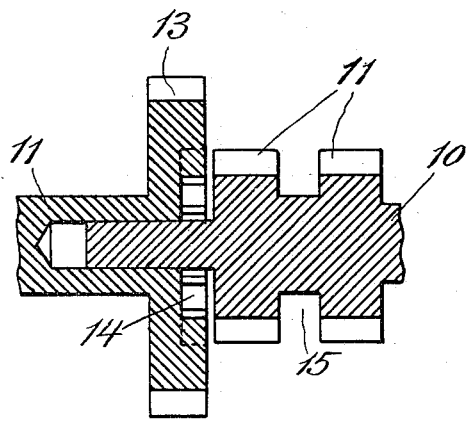

Of the accompanying drawings, Figure 1 represents a plan view of a slide-gear embodying my invention. Fig. 2 represents a transverse section through one end of the casing. Figs. 3 and 4 represent plan views in the plane 3 3 of Fig. 2, showing the gearing in different relations. Fig. 5 represents an elevation of the gears included in the reversing-train. Fig. 6 represents an axial section illustrating the coupling employed for a direct drive at high speed.

The same reference characters indicate the same parts in all the figures.

In the drawings, 10 represents a shaft which may be considered the driver, and 11 the driven shaft alined therewith, the two being formed, respectively, with an elongated driving-gear 12 and a driven gear 13. These members are also formed with a coupling of which one member is in the form of internal gear-teeth 14 in the face of the driven gear 13, while the other member is constituted by the forward ends of the teeth of gear 12. Said gear 12 has a limited axial movement whose sole purpose is to couple the shafts 10 11 when a direct drive at high speed is desired, and at other times to disconnect the coupling. Intermediate its ends the gear 12 is formed with a circumferential groove 15, engaged by a roll 16 on one arm 17 of a lever pivoted at 18 on the upper half of the casing 19, its other arm 20, having a roll 21, occupying slot 22 in the sliding cam-plate 23.

For connecting the shafts 10 11 at other times than on the high speed there is mounted on a counter-axis a sleeve 24, mounted to slide and rotate on a fixed shaft 25, whose ends are supported in the opposite walls of the casing. This sleeve has formed with it a gear 26 for meshing with the driving-gear 12 and a gear 27 for meshing with the driven gear 13. It will be seen that the face of the gear 26 is wider than the slot 15 in gear 12, so that gear 26 slides readily from one portion to the other of said gear 12 as though the latter were continuous.

The gear 26 is concerned in the low-speed drive and also in the reverse drive, for which latter there is provided an additional reversing member composed of the connected pinions 28 29, slidable axially on a fixed stud or shaft 30, mounted similarly to the stud 25. This reversing intermediate member receives the same movement as the sleeve 24, being constrained thereto by means of a pair of flanges 31 31, embracing between them the gear 26. By this means the gear 28 is kept continually in mesh with gear 26, while the gear 29 is adapted to be slid into and out of mesh with gear 13.

For shifting the sleeve 24 there is interposed between gears 26 27 a roll 32, carried by one arm 33 of a lever pivoted at 34 to the upper half of the casing, its other arm 35 having a roll 36, occupying a second cam-slot 37 in the cam-plate 23.

Reciprocating motion is imparted to the slide 23 by suitable mechanism under control of the operator, which may connect with the slide by means of a post or lug 38 on said slide, such reciprocating movement causing the two levers 17 20 and 33 35 to swing on their pivots and shift the gear 12 and the sleeve 24.

The operation is as follows: For highest speed forward the cam-plate 23 is shifted to its extreme position in the direction of the driven shaft 11 and through the medium of lever 17 20 shifts the driving-gear 12 and causes the forward ends of its teeth to couple with the internal teeth 14, Fig. 6, formed on gear 13. At the same time lever 33 35 shifts the sleeve 24 to the rearward extreme of its movement, whereby the gears 26 27 are thrown out of mesh with the driving and driven gears 12 13. This affords a direct connection between the driving and driven shafts 10 11, whereby the latter is caused to rotate at the same speed as the former, and also renders the sleeve 24 and the reversing-gears 28 29 inactive. This position of the parts is shown in Fig. 3. For the low-speed forward drive the cam-plate 23 is shifted to its middle position, (shown in Fig. 1,) and through the levers it shifts the gear 12 out of engagement with the internal teeth of gear 13 and shifts the sleeve 24 so as to bring gears 26 27 thereof respectively into engagement with the driving and driven gears 12 13. The drive from shaft 10 is then through gears 12, 26, 27, and 13 to shaft 11, the ratios of the gears being such as to cause shaft 11 to rotate at a lower speed than shaft 10. For the reverse drive the cam-plate 23 is thrown to its extreme rearward position, which action retains the gear 12 in the same uncoupled position which it occupies in Fig. 1, but shifts the sleeve 24 to the position shown in Fig. 4, thereby throwing gear 27 out of mesh with gear 13 and bringing the reversing-gear 29 into mesh therewith. The gear 26 remains in engagement with the elongated driving-gear 12 and the drive is then from shaft 10, through gears 12, 26, 28, 29, and 13, to shaft 11. The reversing-train is best seen in Fig. 5. It will be seen that on the direct or high-speed drive no gears whatever are running in mesh, and this is accomplished simply by a continuation of those movements of the shiftable member 24 which are required to effect the change of gears.

The construction described is particularly adapted to a two-speed forward drive, but might obviously be arranged for one or more further speeds by providing an additional member similar to 24 and an additional driven gear similar to 13 or otherwise.

I claim—

1. In a slide-gear, the combination of alined driving and driven members, gears carried thereby, an axially-shiftable gearing member for connecting the driving and driven gears in a forward-driving relation, and reversing-gearing carried with said axially-shiftable member into and out of train between the driving and driven gears.

2. In a slide-gear, the combination of alined driving and driven members, gears carried thereby, a counter-shaft, a gearing member axially shiftable on said counter-shaft to connect and disconnect said gears, a second counter-shaft, reversing-gearing mounted thereon in train with said member, and means connecting said reversing-gearing and said member for conjoint shifting movements in the same direction.

3. In a slide-gear, the combination of alined driving and driven gears, a counter-shaft, an intermediate member shiftable on said counter-shaft, and having a gear connecting with the driving-gear in both forward and reverse driving, and a gear connecting with the driven gear in forward driving only, and reversing-gearing connecting with the driven gear and the first said gear of the intermediate member.

4. In a slide-gear, the combination of a gear axially shiftable and formed with a groove intermediate its ends, means occupying said groove for shifting said gear, and a second gear wider than the groove and slidable relative to the first said gear to engage either portion of the latter.

In testimony whereof I have affixed my signature in presence of two witnesses.

HERBERT H. BUFFUM.

Witnesses:
H. L. ROBBINS,
A. C. RATIGAN.